(12) United States Patent
Yamada et al.

(10) Patent No.: US 8,285,144 B2
(45) Date of Patent: Oct. 9, 2012

(54) OPTICAL DEVICE FOR REARRANGING WAVELENGTH CHANNELS

(75) Inventors: Hiroaki Yamada, San Jose, CA (US);
Barthelemy Fondeur, San Jose, CA (US); Jinxi Shen, San Ramon, CA (US); Zi-Wen Dong, San Ramon, CA (US); Domenico Di Mola, Milpitas, CA (US); Jyoti K. Bhardwaj, Cupertino, CA (US); Yimin Hua, Los Altos, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 209 days.

(21) Appl. No.: 12/847,220

(22) Filed: Jul. 30, 2010

(65) Prior Publication Data

US 2011/0052189 A1 Mar. 3, 2011

Related U.S. Application Data

(60) Provisional application No. 61/229,928, filed on Jul. 30, 2009.

(51) Int. Cl.
*H04J 14/02* (2006.01)

(52) U.S. Cl. .......... 398/79; 398/82; 398/41; 398/42; 398/135

(58) Field of Classification Search .......... 398/42, 398/79, 82, 85, 87, 41, 135; 385/24
See application file for complete search history.

(56) References Cited

U.S. PATENT DOCUMENTS

| | | | | |
|---|---|---|---|---|
| 5,295,011 A * | 3/1994 | Heise | | 398/42 |
| 5,680,490 A * | 10/1997 | Cohen et al. | | 385/24 |
| 6,023,542 A * | 2/2000 | Pan et al. | | 385/24 |
| 6,163,393 A * | 12/2000 | Wu et al. | | 398/1 |
| 6,545,782 B1 * | 4/2003 | Wang et al. | | 398/79 |
| 6,996,302 B2 * | 2/2006 | Hamada | | 385/14 |
| 7,035,505 B2 * | 4/2006 | Shen et al. | | 385/24 |
| 7,088,885 B1 * | 8/2006 | Wang | | 385/24 |
| 7,869,711 B2 * | 1/2011 | Ji et al. | | 398/79 |
| 2002/0081062 A1 * | 6/2002 | He | | 385/24 |
| 2002/0150329 A1 * | 10/2002 | Ahn et al. | | 385/24 |
| 2003/0002102 A1 * | 1/2003 | Khalfallah et al. | | 359/124 |
| 2004/0018019 A1 * | 1/2004 | Lacey et al. | | 398/82 |
| 2005/0019031 A1 * | 1/2005 | Ye et al. | | 398/19 |
| 2005/0031259 A1 * | 2/2005 | Shen et al. | | 385/24 |
| 2005/0141077 A1 * | 6/2005 | Kim et al. | | 359/333 |
| 2005/0271093 A1 * | 12/2005 | Wang | | 372/25 |
| 2006/0115270 A1 * | 6/2006 | Kim et al. | | 398/71 |
| 2007/0116468 A1 * | 5/2007 | Ji et al. | | 398/79 |
| 2007/0183778 A1 * | 8/2007 | Jung et al. | | 398/72 |

* cited by examiner

*Primary Examiner* — Kenneth N Vanderpuye
*Assistant Examiner* — Hibret Woldekidan
(74) *Attorney, Agent, or Firm* — Matthew A. Pequignot; Pequignot + Myers LLC (57) ABSTRACT

An optical device for rearranging wavelength channels in an optical network is disclosed. The optical device has a wavelength selective coupler having one input port and a plurality of output ports coupled to a plurality of input ports of an optical grating demultiplexor such as an arrayed waveguide grating. The wavelength channels in each of the input ports are dispersed by the demultiplexor and are directed to a plurality of output ports of the optical grating demultiplexor. As a result, at least one wavelength channel at each of the input ports of the optical grating demultiplexor is coupled into a common output port. The optical device is useful in passive optical networks wherein a same demultiplexor is used for simultaneous multiplexing and demultiplexing of wavelength channels.

14 Claims, 5 Drawing Sheets

OPTICAL DEVICE FOR REARRANGING WAVELENGTH CHANNELS

CROSS-REFERENCE TO RELATED APPLICATIONS

The present invention claims priority from U.S. Provisional Patent Application No. 61/229,928 filed Jul. 30, 2009 which is incorporated herein by reference for all purposes.

TECHNICAL FIELD

The present invention relates to optical devices for routing and directing optical signals, and in particular to optical devices for rearranging wavelength-multiplexed optical signals in an optical communications network.

BACKGROUND OF THE INVENTION

The Internet services are currently provided using interconnected long-haul and metro optical networks. In modern long-haul and metro optical networks, optical signals are modulated with digital information and transmitted from one location to another, typically through a length of an optical fiber. To increase the information carrying capacity of the networks, modulated optical signals at different wavelengths, called "wavelength channels", are grouped together (multiplexed) at one location of the network, transmitted through a common fiber to the other location of the network, and ungrouped (demultiplexed) at the other location.

As the Internet, Voice over Internet Protocol (VoIP) and streamed Internet Protocol (IP) television gain popularity, more and more subscribers desire to access these services from their premises. At present, these services are delivered to individual premises using either a twisted-pair Digital Subscriber Line (DSL) or a coaxial television cable. Due to the increased demand, the DSL and coaxial cable technologies are reaching their information carrying capacity limits, and optical technologies (so-called "Fiber To The Premises", or FTTP) are increasingly used for delivering Internet services to individual premises.

Most FTTP technologies presently use a passive optical network (PON) architecture to provide fiberoptic access to the premises, because a PON architecture does not require expensive amplification and wavelength selective switching equipment commonly used in long-haul and metro optical networks. To deliver communication services from a central office to multiple individual subscribers, most PON systems use a passive star-type optical splitter and a form of time-division multiplexing (TDM) for delivering downstream and upstream information.

Disadvantageously, TDM-PON systems are quite complex and do not always provide a required degree of security of communications. A wavelength-division multiplexing (WDM) architecture can be attractive for a PON application, because in a WDM-PON, different wavelengths can be assigned to different subscribers or groups of subscribers, thus providing a higher degree of security of communications than a TDM-PON can provide. Furthermore, a WDM-PON architecture can potentially provide a broader bandwidth than a TDM-PON architecture. Nonetheless, WDM-PON systems so far have been relatively costly. For this reason, WDM-PON systems have not yet found a widespread utilization in cost-sensitive FTTH applications.

Figure 1A:
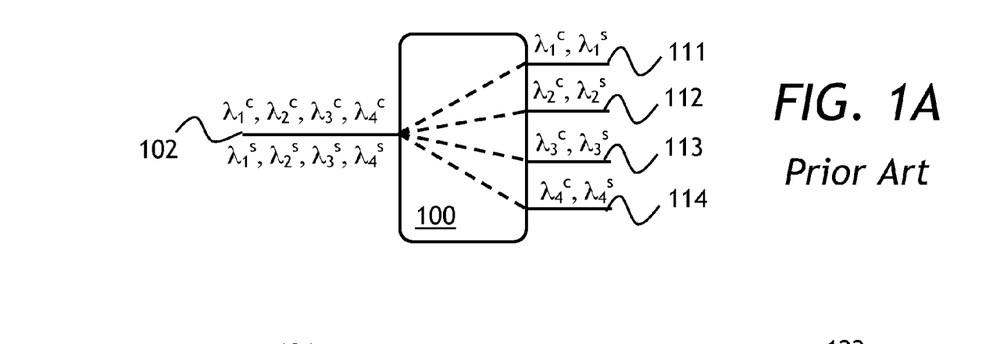
FIG. 1A is a block diagram of a prior-art arrayed waveguide demultiplexor.
Figure 1B:
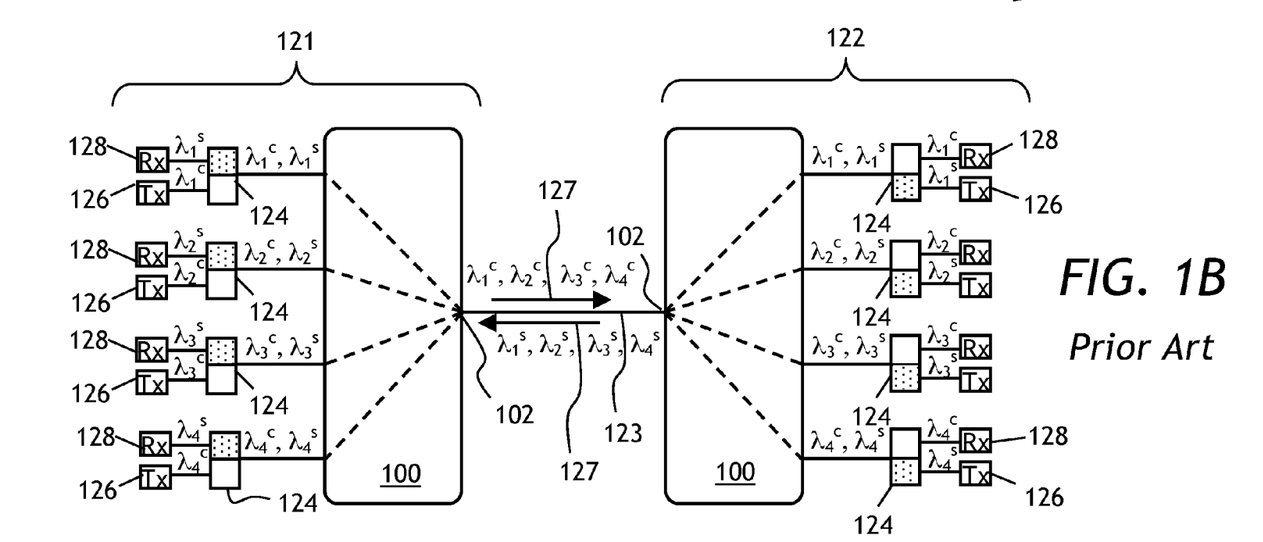
FIG. 1B is a block diagram of a WDM passive optical network having two demultiplexors of FIG. 1A.

WDM-PON systems utilize wavelength-selective combiners and splitters of optical signals called "WDM multiplexors" and "WDM demultiplexors", respectively. To save costs, a WDM multiplexor and a WDM demultiplexor of a WDM-PON system can be combined into a single unit, which is referred to as a "de/multiplexor". Referring to FIG. 1A, a prior-art arrayed waveguide (AWG) WDM de/multiplexor 100 is shown having a single input port 102 and four output ports 111 to 114. Four wavelength channels $\lambda_1^C, \lambda_2^C, \lambda_3^C, \lambda_4^C$ of central ("C") band of optical communications and four wavelength channels $\lambda_1^S, \lambda_2^S, \lambda_3^S, \lambda_4^S$ of short ("S") band optical communications are present at the input port 102. The WDM de/multiplexor 100 directs wavelengths $\lambda_1^C, \lambda_1^S$ to the output port 111; wavelengths $\lambda_2^C, \lambda_2^S$ to the output port 112; wavelengths $\lambda_3^C, \lambda_3^S$ to the output port 113; and wavelengths $\lambda_4^C, \lambda_4^S$ to the output port 114. To direct different wavelengths to a same output port, the WDM de/multiplexor 100 uses a diffractive optical device having multiple orders of diffraction. The WDM de/multiplexor 100 is bidirectional, that is, the wavelength channels arriving at the output ports 111-114 can be combined into a single multi-channel signal at the input port 102. Referring now to FIG. 1B, a WDM-PON 120 has two nodes 121 and 122 coupled through a length of an optical fiber 123. Each node 121 and 122 has one WDM de/multiplexor 100. The input ports 102 of the WDM de/multiplexors 100 of the nodes 121 and 122 are connected together by the optical fiber 123. The output ports 111 to 114 of the WDM de/multiplexors 100 are coupled to duplex optical filters 124 coupled to corresponding transmitters 126 and receivers 128. The node 121 uses the wavelength channels $\lambda_1^C, \lambda_2^C, \lambda_3^C, \lambda_4^C$ for transmission and the wavelength channels $\lambda_1^S, \lambda_2^S, \lambda_3^S, \lambda_4^S$ for reception. The node 122 uses the wavelength channels $\lambda_1^S, \lambda_2^S, \lambda_3^S, \lambda_4^S$ for transmission and the wavelength channels $\lambda_1^C, \lambda_2^C, \lambda_3^C, \lambda_4^C$ for reception. The direction of flow of the signals is shown with arrows 127. Thus, each WDM de/multiplexor 100 is used for both multiplexing and demultiplexing wavelength channels, whereby significant cost savings can be achieved.

Disadvantageously, in the AWG WDM de/multiplexor 100, and in any diffraction grating based demultiplexor for that matter, the wavelengths of the channels $\lambda_i^S$ and $\lambda_i^C$ directed to a same $i^{th}$ output port in different orders of diffraction m and m+1 are tied together by the grating equation: $\lambda_i^S \approx \lambda_i^C m/(m+1)$ and therefore cannot be selected independently from each other. As a result, the WDM-PON 120 does not allow a system designer to select the wavelength channels $\lambda_1^C, \lambda_2^C, \lambda_3^C, \lambda_4^C$ independently from the wavelength channels $\lambda_1^S, \lambda_2^S, \lambda_3^S, \lambda_4^S$. This represents a considerable limitation, especially for a FTTP application where the available bandwidth needs to be utilized to a full extent to provide as broad coverage as possible at a given cost.

It is therefore an object of the invention to provide an optical device for directing and regrouping wavelength channels, wherein the wavelengths of the channels directed to the same output port are independently selectable. The independent wavelength selection improves bandwidth utilization and network efficiency. As a result, a deployment cost to provide a FTTH-based broadband Internet service to individual subscribers is reduced.

SUMMARY OF THE INVENTION

An optical device of the invention achieves independent routing of two or more wavelength channels to a same output port of an optical grating multiplexor by providing two or more separate input ports for the optical grating demultiplexor. The input ports are offset from each other so as to provide a required wavelength separation between the two or more wavelength channels intended for coupling to a same output port. The wavelength channels are initially separated into two or more groups of channels, one group per one input port of the optical grating multiplexor. The groups of wavelength channels are then separately coupled to the input ports of the optical grating multiplexor.

In accordance with the invention there is provided an optical device for rearranging wavelength channels, comprising: a wavelength selective coupler having an input port and first and second output ports, for separating wavelength channels received at the input port into first and second groups of wavelength channels for output at the first and the second output ports, respectively;
an optical grating demultiplexor having first and second input ports optically coupled to the first and the second output ports of the wavelength selective coupler, respectively, and a plurality of output ports, for demultiplexing the first and the second groups of wavelength channels;
wherein the first and the second input ports of the optical grating demultiplexor are offset from each other so as to couple a wavelength channel of the first group from the first input port, together with a wavelength channel of the second group from the second input port, into a same output port of the optical grating demultiplexor.

In one embodiment, the wavelength selective coupler includes an optical interleaver having one input and two outputs coupled to the first and the second input ports of the optical grating demultiplexor. Advantageously, this allows one to use the optical grating demultiplexor having channel spacing twice as big as the channel spacing of the wavelength channels. By way of example, this embodiment of the invention allows a 100 GHz demultiplexor to be used in an optical network having 50 GHz spaced channels.

In one embodiment, the optical device of the invention further includes a plurality of wavelength selective splitters. Each wavelength selective splitter is optically coupled to one of the plurality of the output ports of the optical grating demultiplexor, functioning as a separator of wavelength channels of the first group from wavelength channels of the second group. The wavelength selective splitters are preferably duplex filters for bidirectional communication, wherein the first group of channels carries information in one direction, and the second group of channel carries information in the other, opposite direction.

In accordance with another aspect of the invention there is further provided an optical network node comprising:
the optical device for rearranging the wavelength channels;
a plurality of receivers each coupled to a particular one of the duplex filters for receiving a transmission channel; and
a plurality of transmitters each coupled to a particular one of the duplex filters for transmitting a transmission channel.

In accordance with yet another aspect of the invention there is further provided an optical network comprising two optical network nodes and an optical transmission line that couples together the input ports of the wavelength selective couplers of the two optical network nodes,
wherein the transmission channels of the first optical network node are the reception channels of the second optical network node, and vice versa.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2A:
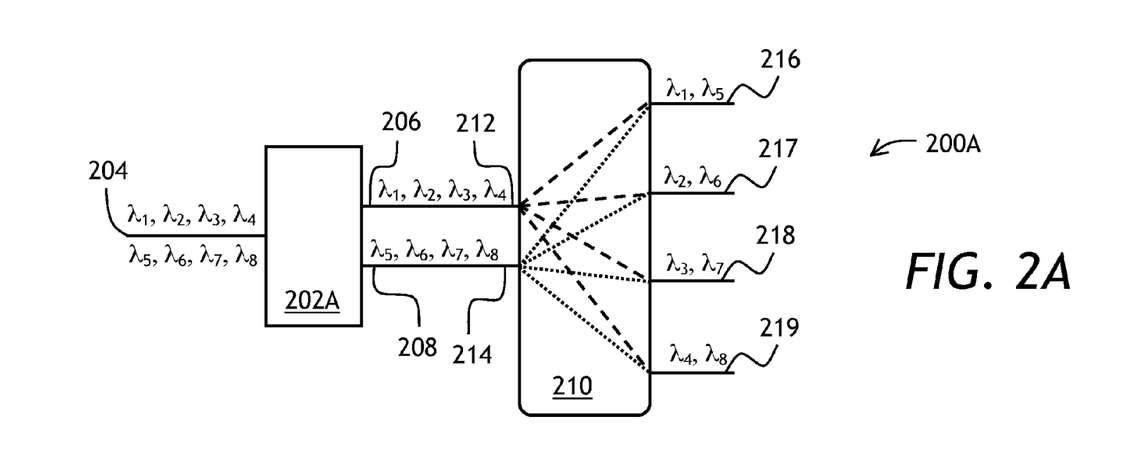
FIG. 2A is a block diagram of an optical device of the invention having a wavelength division multiplexor coupled to an optical grating demultiplexor.

Referring to FIG. 2A, an optical device 200A of the invention includes a wavelength division multiplexor 202A coupled to an optical grating demultiplexor 210. The wavelength division multiplexor 202A has an input port 204 and first and second output ports 206 and 208, respectively. The function of the wavelength division multiplexor 202A is to separate wavelength channels $\lambda_1$ to $\lambda_8$ received at the input port 204 into first and second groups of wavelength channels $\lambda_1$ to $\lambda_4$ and $\lambda_5$ to $\lambda_8$, respectively, and direct them to the first and the second output ports 206 and 208, respectively.

The first and the second output ports 206 and 208 are coupled to first and second input ports 212 and 214, respectively, of the optical grating demultiplexor 210. The function of the optical grating demultiplexor 210 is to demultiplex the first and the second groups of wavelength channels $\lambda_1$ to $\lambda_8$ and to direct the demultiplexed channels towards a plurality of output ports 216 to 219 of the optical grating demultiplexor 210. The first and the second input ports 212 and 214 of the optical grating demultiplexor 210 are offset from each other so as to couple a wavelength channel of the first group $\lambda_1$ to $\lambda_4$ from the first input port 212, together with a wavelength channel of the second group $\lambda_5$ to $\lambda_8$ from the second input port 214, into a same output port 216, 217, 218, or 219, of the optical grating demultiplexor 210. Thus, the output port 216 has the wavelength channels $\lambda_1$ and $\lambda_5$; the output port 217 has the wavelength channels $\lambda_2$ and $\lambda_6$; the output port 218 has the wavelength channels $\lambda_3$ and $\lambda_7$; and the output port 219 has the wavelength channels $\lambda_4$ and $\lambda_8$. Advantageously, the presence of two offset input ports 212 and 214 allows the wavelengths $\lambda_1$ and $\lambda_5$ to be individually selectable by adjusting the magnitude of the offset between the input ports 212 and 214. The wavelength adjustability will be illustrated further below.

Figure 2B:
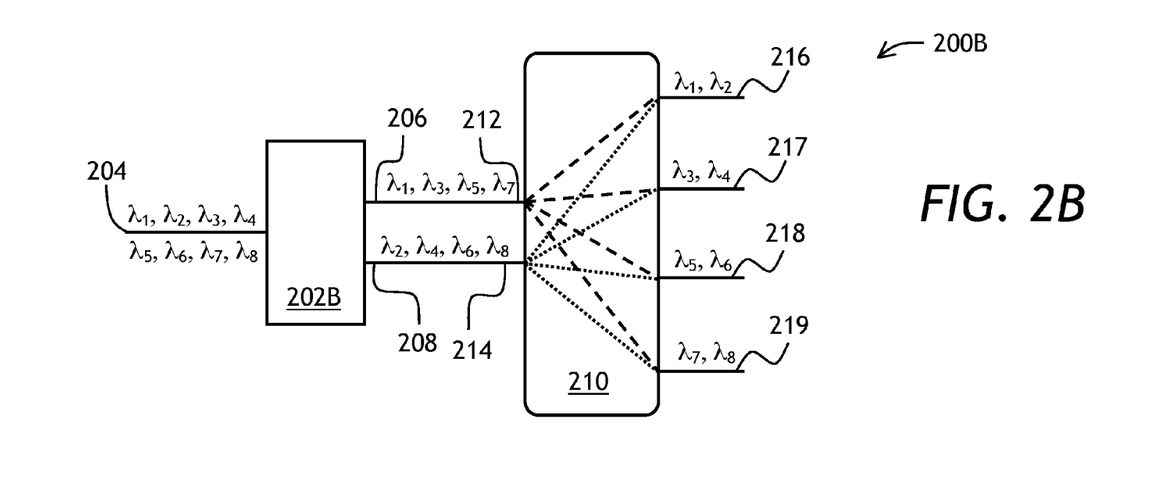
FIG. 2B is a block diagram of an optical device of the invention having an optical interleaver coupled to an optical grating demultiplexor.

Turning now to FIG. 2B, an optical device 200B is an alternative embodiment of the optical device 200A. One difference between the optical devices 200A and 200B is that the optical device 200B includes an optical interleaver 202B instead of the WDM filter 202A. The function of the optical interleaver 202B is to separate wavelength channels $\lambda_1$ to $\lambda_8$ received at the input port 204 into first and second groups of wavelength channels $\lambda_1, \lambda_3, \lambda_5, \lambda_7$ and $\lambda_2, \lambda_4, \lambda_6, \lambda_8$, respectively, and direct them to the first and the second output ports 206 and 208, respectively. The optical interleaver preferably has an input channel spacing twice as small as a channel spacing of the optical grating demultiplexor 310. Advantageously, the optical grating demultiplexor 210 can have a larger channel spacing than the channel spacing of an optical network wherein the optical device 200B is used. For example, the optical grating demultiplexor 210 can have a 100 GHz channel spacing, while the optical network it is used in can have a 50 GHz channel spacing.

Figure 2C:
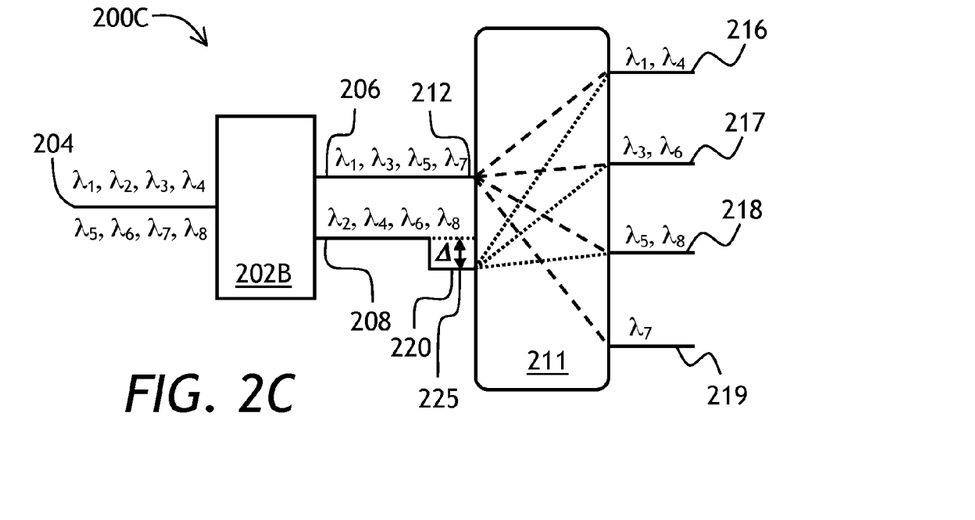
FIG. 2C is a block diagram of a variant of the optical device of FIG. 2B having a different offset between the input ports of the optical grating demultiplexor.

As noted above, one important advantage of the invention is the adjustability of wavelengths of the channels that are coupled together in the same output port 216, 217, 218, or 219 of the optical grating demultiplexor. Turning to FIG. 2C, an optical device 200C is shown. The optical device 200C is a variant of the optical device 200B. One difference between the optical devices 200B and 200C is that an optical grating demultiplexor 211 of the optical device 200C has an input 220 that is offset by an additional amount of $\varDelta$ as compared to a position of the corresponding input 214 of the optical grating demultiplexor 210 of the optical device 200B of FIG. 2B. The additional offset $\varDelta$ is illustrated at 225 in FIG. 2C. The additional offset $\varDelta$ determines which ones of the wavelength channels $\lambda_2, \lambda_4, \lambda_6, \lambda_8$ are coupled to which ones of the output ports 216 to 219 of the optical grating demultiplexor 211.

Figure 3:
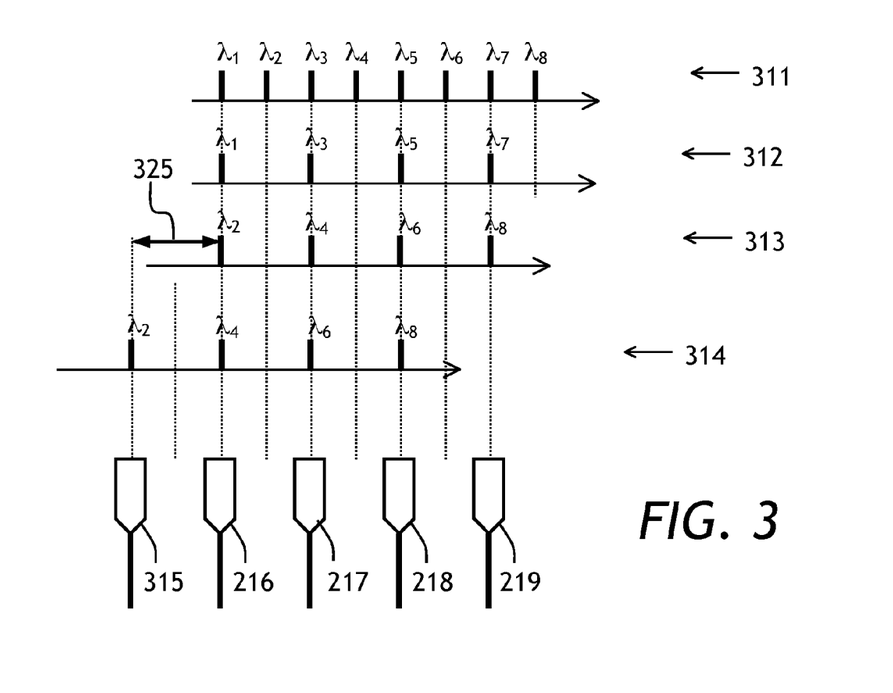
FIG. 3 is a spectrum of wavelength channels coupled to the input ports of the optical devices of FIGS. 2B and 2C.

Referring now to FIG. 3, a spectrum 311 shows the wavelength channels $\lambda_1$ to $\lambda_8$ at the input port 204 of the optical devices 200B and 200C of FIGS. 2B and 2C. In FIG. 3, a spectrum 312 shows the wavelength channels $\lambda_1, \lambda_3, \lambda_5, \lambda_7$ at the upper input port 212 of the optical grating demultiplexors 210 and 211.

A spectrum 313 shows even wavelength channels $\lambda_2, \lambda_4, \lambda_6, \lambda_8$ at the lower input port 214 of the optical grating demultiplexor 210 of FIG. 2B. In FIG. 3, the spectrum 313 is shifted so that the even wavelength channels $\lambda_2, \lambda_4, \lambda_6, \lambda_8$ line up with the odd wavelength channels $\lambda_1, \lambda_3, \lambda_5, \lambda_7$, due to the offset between the input ports 212 and 214 of the optical grating demultiplexor 210 of FIG. 2B. As a result of the offset, the pairs of wavelength channels $\lambda_1$ and $\lambda_2$; $\lambda_3$ and $\lambda_4$; $\lambda_5$ and $\lambda_6$; $\lambda_7$ and $\lambda_8$ are coupled into the output ports 216 to 219, respectively. The output ports 216 to 219 are shown in FIG. 3 lined up with the corresponding wavelength channel pairs $\lambda_1$ and $\lambda_2$; $\lambda_3$ and $\lambda_4$; $\lambda_5$ and $\lambda_6$; $\lambda_7$ and $\lambda_8$.

A spectrum 314 shows the even wavelength channels $\lambda_2, \lambda_4, \lambda_6, \lambda_8$ at the lower input port 220 of the optical grating demultiplexor 211 of FIG. 2C. In FIG. 3, the spectrum 314 is shifted as shown at 325 so that the wavelength channels $\lambda_4, \lambda_6, \lambda_8$ line up with the wavelength channels $\lambda_1, \lambda_3, \lambda_5$ due to the additional offset $\varDelta$ shown at 225. As a result of the additional offset $\varDelta$, the pairs of wavelength channels $\lambda_1$ and $\lambda_4$; $\lambda_3$ and $\lambda_6$; $\lambda_5$ and $\lambda_8$ are coupled into the output ports 216 to 218, respectively. The output ports 216 to 218 are shown in FIG. 3 lined up with the corresponding wavelength channel pairs $\lambda_1$ and $\lambda_4$; $\lambda_3$ and $\lambda_6$; $\lambda_5$ and $\lambda_8$. The remaining wavelength channels $\lambda_2$ and $\lambda_7$ are coupled into an additional output port 315 and the output port 219, respectively. The additional output port 315 is not shown in FIG. 2C.

By properly selecting the additional offset $\varDelta$, one can increase the wavelength separation of the wavelength channels coupled together into a same output port of the optical grating demultiplexor 211. In FIG. 3, for example, wavelength channel pairs $\lambda_1$ and $\lambda_4$ at the output port 216 are separated three times more than the input channels $\lambda_1$ and $\lambda_2$. Advantageously, selecting wavelength channels that are separated by at least three times more than the input channel spacing to be directed to a same output port, simplifies subsequent demultiplexing of these channels, because of the increased wavelength separation of these wavelength channels. At the same time, the advantage brought in by the interleaver 202B, specifically a wider channel spacing of the optical grating demultiplexor 211, is kept. In other words, the optical grating demultiplexor 211 can have a channel spacing that is twice bigger than the channel spacing at the input of the optical device 200C.

Figure 4:
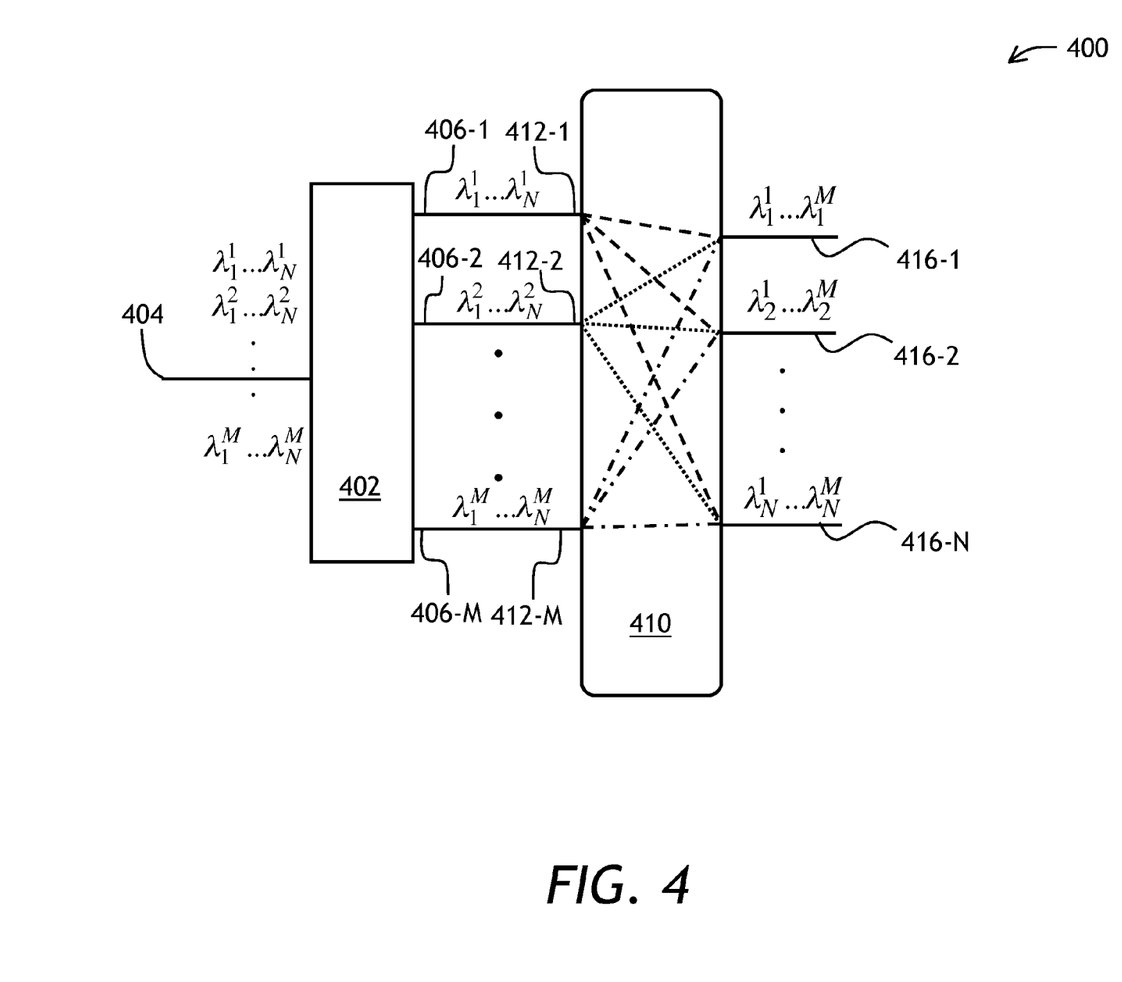
FIG. 4 is a block diagram of an optical device of the invention having 1:N wavelength selective coupler and N:M optical grating demultiplexor.

Referring now to FIG. 4, a more general form of an optical device of the invention is presented. An optical device 400 of the invention has a 1:M wavelength selective coupler 402 having one input port 404 and M output ports 406-1 . . . 406-M, wherein M≧3. The 1:M wavelength selective coupler 402 is coupled to an M:N optical grating demultiplexor 410 having M input ports 412-1 . . . 412-M and N output ports 416-1 . . . 416-N, wherein N≧3. The M output ports 406-1 . . . 406-M of the 1:M wavelength selective coupler 402 are coupled to the M input ports 412-1 . . . 412-M of the M:N optical grating demultiplexor 410, respectively. The function of the 1:M wavelength selective coupler 402 is to separate wavelength channels $\lambda_1^1 \ldots \lambda_N^1, \lambda_1^2 \ldots \lambda_N^2, \ldots,$ and $\lambda_1^M \ldots \lambda_N^M$ into M groups of wavelength channels $\lambda_1^1 \ldots \lambda_N^1; \lambda_1^2 \ldots \lambda_N^2; \ldots;$ and $\lambda_1^M \ldots \lambda_N^M$, each group being directed to a corresponding output port 406-1; 406-2; . . . ; 406-M. The function of the optical grating demultiplexor 410 is to demultiplex wavelength channels of each of the M groups received at M input ports 412-1 . . . 412-M and to direct the demultiplexed channels $\lambda_1^1 \ldots \lambda_1^M; \lambda_2^1 \ldots \lambda_2^M; \ldots;$ and $\lambda_N^1 \ldots \lambda_N^M$ towards the output ports 416-1 . . . 416-N, respectively. By properly selecting the positions of the input ports 412-1 . . . 412-M of the M:N optical grating demultiplexor 410, one can select which wavelength channels are directed to which one of the output ports 416-1 . . . 416-N. The positions of the input ports are selected based on a grating equation of an optical grating used in the M:N optical grating demultiplexor 410. The grating equations of some commonly used optical gratings are given further below.

The WDM coupler 202A or 402 can use any type of a wavelength selective filter such a dichroic (thin film) optical filter, for example. The WDM couplers 202A and 402 and the interleaver 202B can be replaced with any other type of a wavelength selective coupler for separating wavelength channels received at the input port 204 into at least two groups of (not necessarily adjacent) wavelength channels. The optical interleaver 202B preferably includes at least one Mach-Zehnder (MZ) interferometer. Two serially coupled MZ interferometers forming a lattice filter are further preferable. The optical grating demultiplexors 210, 211, and 410 can include an arrayed waveguide grating (AWG), a bulk Echelle grating, a slab Echelle grating, or a bulk diffraction grating.

Figure 5:
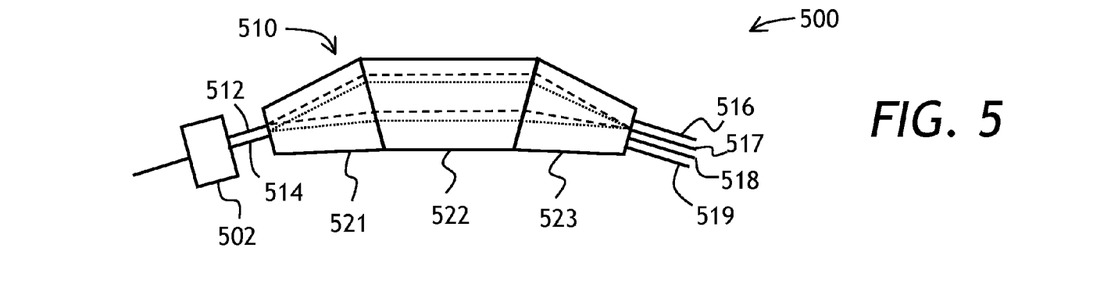
FIG. 5 is a plan view of an optical device of FIGS. 2A to 2C, having an arrayed waveguide grating.

Referring to FIG. 5, an optical device 500 of the invention includes serially coupled a 1×2 wavelength selective coupler 502 and an AWG demultiplexor 510 having an input slab section 521, a waveguide section 522 coupled to the input slab section 521, an output slab section 523 coupled to the waveguide section 522, two input waveguides 512 and 514 coupled to the input slab section 521, and a plurality of output waveguides 516 to 519 coupled to the output slab sections 523. The AWG demultiplexor 510 is preferably based on an athermal AWG using any athermal AWG types known to a person skilled in the art. The wavelength selective coupler 502 is preferably waveguide based, so it can be integrated on the same waveguide substrate as the AWG demultiplexor 510.

The principle of adjustability of which wavelength channel is directed to which output port (depending on the input port position) will now be explained. The relative position of the input ports 212 and 214 of the optical grating demultiplexor 210; the relative position of the input ports 212 and 220 of the optical grating demultiplexor 211; the relative position of the input ports 412-1 . . . 412-M of the M:N optical grating demultiplexor 410; and the relative position of the input ports 512 and 514 of the arrayed waveguide grating demultiplexor 510 is defined by a grating equation of a particular optical grating used in these devices. The grating equations of various optical gratings are known to one of ordinary skill in the art. The grating equation of an arrayed waveguide grating, for example, is $$n_s(\lambda)p\sin(\theta_{in})+n_s(\lambda)p\sin(\theta out)+n_w(\lambda)\Delta L=m\lambda \quad (1),$$

wherein $n_s(\lambda)$ is a refractive index of the slab sections 521 and 523, $n_w(\lambda)$ is a refractive index of the waveguide section 522, $\theta_{in}$ is an input beam angle of an optical beam emitted by the input waveguide 512 or the input waveguide 514, $\theta_{out}$ is an output beam angle of an optical beam coupled into the output waveguides 516 to 519, $\Delta L$ is an optical path difference between neighboring waveguides of the waveguide section 522, p is a waveguide spacing of the waveguide section 522, and m is an order of diffraction. According to the grating equation (1), by selecting proper angles $\theta_{in}$, which depends on a position of an input waveguide, different wavelength channels can be coupled into a same output waveguide in a different orders of diffraction m or even in a same order of diffraction m.

The grating equation of a free-space diffraction grating is similar to Equation (1) above:

$$nd(\sin\theta_{in}+\sin\theta_{out})=m\lambda \quad (2),$$

wherein n is refractive index of a medium the diffraction grating is in, and d is a groove spacing of the diffraction grating. By properly selecting the input beam angles $\theta_{in}$, one can couple different wavelength channels into a same output port. The input beam angles $\theta_{in}$ and the output beam angles $\theta_{out}$ depend on position of the input and output ports of the free-space diffraction grating and on a focal length of a lens or lenses used to collimate the input and the output beams. These free space lenses correspond to the input and the output slabs 521 and 523 of the arrayed waveguide grating demultiplexor 510 of FIG. 5.

In the optical grating demultiplexors 210, 211, and 410, the input ports 212, 214, 220, and 412-1 to 412-M can be disposed so that different wavelength channels can be directed to a same output port by diffracting into different orders of diffraction. This provides for a freedom to space the input ports apart by enough of a distance to prevent crosstalk, for example. Furthermore, according to the present invention and the Equations (1) and (2) above, the input ports 212, 214, 220, and 412-1 to 412-M can also be disposed so that different wavelength channels are directed to a same output port by diffracting into a same order of diffraction m. This provides an important design benefit because the optical grating demultiplexors 210, 211, and 410 do not need to be optimized for operation in different orders of diffraction, which allows one to achieve a better optical performance in a single order of diffraction m.

Figure 6:
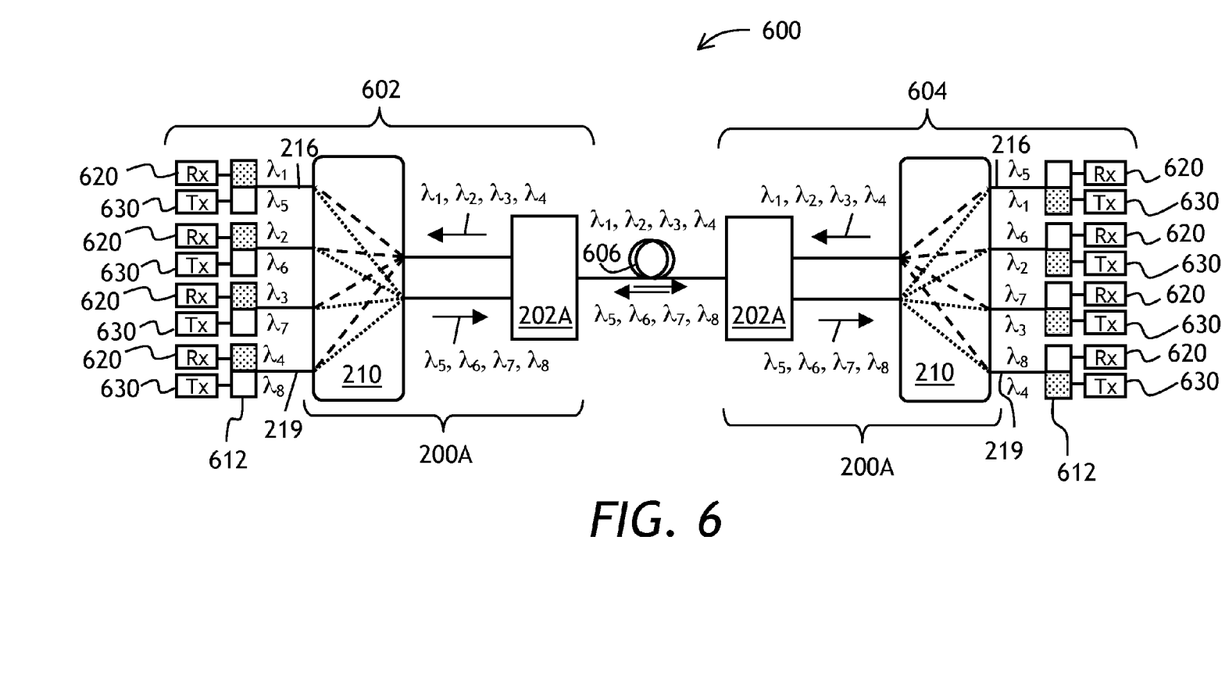
FIG. 6 is a block diagram of an optical network of the invention.

Turning now to FIG. 6, an optical network 600 of the invention includes nodes 602 and 604 coupled by a length of an optical fiber 606. Each of the nodes includes the optical device 200A of the invention, a plurality of duplex filters 612 coupled to the output ports 216 to 219 of the optical grating demultiplexors 210, for separating wavelength channels present at the output ports 216 to 219, a plurality of receivers 620 each coupled to a particular one of the duplex filters 612, and a plurality of transmitters 630 each coupled to a particular one of the duplex filters 612. As seen in FIG. 6, the wavelength channels $\lambda_5$ to $\lambda_8$ are transmission wavelength channels for the node 602 and are accordingly reception wavelength channels for the node 604. The wavelength channels $\lambda_1$ to $\lambda_4$ are reception wavelength channels for the node 602 and are transmission wavelength channels for the node 604. Of course, the wavelength selective coupler 502, the interleaver 202B, or the 1×M wavelength selective splitter 402 can be used in place of the wavelength division multiplexor 202A, and the AWG demultiplexor 510, the optical grating demultiplexor 211, or the M×N optical grating demultiplexor 410 can be used in place of the optical grating demultiplexor 210. The transmitters 630 are preferably laser diodes, although light emitting diodes (LEDs) can also be used. The receivers 620 are preferably PIN or avalanche photodiodes.

What is claimed is:

1. An optical network comprising first and second optical network nodes, each node comprising an optical device for rearranging wavelength channels, each optical device comprising:
    a wavelength selective coupler having an input port and first and second output ports, for separating wavelength channels received at the input port into first and second groups of wavelength channels for output at the first and the second output ports, respectively;
    an optical grating demultiplexor having first and second input ports optically coupled to the first and the second output ports of the wavelength selective coupler, respectively, and a plurality of output ports, for demultiplexing the first and the second groups of wavelength channels;
    wherein the first and the second input ports of the optical grating demultiplexor are offset from each other so as to couple a wavelength channel of the first group from the first input port, together with a wavelength channel of the second group from the second input port, into a same output port of the optical grating demultiplexor,
    a plurality of wavelength selective splitters, wherein each one of the plurality of wavelength selective splitters is optically coupled to one of the plurality of the output ports of the optical grating demultiplexor, for separating wavelength channels of the first group from wavelength channels of the second group;
    wherein the first group includes transmission channels and the second group includes reception channels,
    wherein the first and the second wavelength selective splitters include duplex filters for separating the transmission channels from the reception channels;
    wherein each of the first and second nodes further comprises
    a plurality of receivers each coupled to a particular one of the duplex filters for receiving one of the reception channels; and
    a plurality of transmitters each coupled to a particular one of the duplex filters for transmitting one of the transmission channels;
    wherein the optical network further comprises an optical transmission line that couples together the input ports of the wavelength selective couplers of the first and the second optical network nodes, and
    wherein the transmission channels of the first optical network node are the reception channels of the second optical network node, and the reception channels of the first optical network node are the transmission channels of the second optical network node.

2. The optical network of claim 1, wherein the wavelength selective couplers of the optical devices for rearranging wavelength channels each comprise a WDM coupler.

3. The optical network of claim 2, wherein the WDM couplers each include a dichroic optical filter.

4. The optical network of claim 1, wherein the wavelength selective couplers of the optical devices for rearranging wavelength channels each comprise an optical interleaver.

5. The optical network of claim 4, wherein the optical interleavers each include a Mach-Zehnder interferometer.

6. The optical network of claim 4, wherein the optical interleavers each have an input channel spacing twice as small as a channel spacing of the corresponding optical grating demultiplexor.

7. The optical network of claim 6, wherein the first and the second input ports of the optical grating demultiplexors of the optical devices for rearranging wavelength channels are disposed so that a difference in wavelength between one of the wavelength channels of the first group and one of the wavelength channels of the second group coupled into a same output port of each of the optical grating demultiplexors is at least three times as big as the input channel spacing of the optical interleavers.

8. The optical network of claim 1, wherein the optical grating demultiplexors of the optical devices for rearranging wavelength channels are selected from the group consisting of an arrayed waveguide grating, an Echelle grating, and a bulk diffraction grating.

9. The optical network of claim 1, wherein the wavelength selective couplers of the optical devices for rearranging wavelength channels each have three or more output ports, and the optical grating demultiplexors of the optical devices for rearranging wavelength channels each have three or more input ports each optically coupled to a particular one of the three or more output ports of the corresponding wavelength selective coupler, wherein the three or more input ports of the optical grating demultiplexors are offset from each other so as to couple at least some wavelength channels received in each of three or more input ports into a same output port of the corresponding optical grating demultiplexor.

10. The optical network of claim 1, wherein the first and the second input ports of the optical grating demultiplexors of the optical devices for rearranging wavelength channels are each disposed so as to cause the wavelength channel of the first group and the wavelength channel of the second group propagating therein towards the same output port thereof to diffract into a same order of diffraction.

11. The optical network of claim 1, wherein the optical network is a passive optical network.

12. The optical network of claim 11, wherein the optical grating demultiplexors of the first and the second nodes include arrayed waveguide gratings.

13. The optical network of claim 12, wherein the wavelength selective coupler is selected from the group consisting of a WDM coupler and an optical interleaver.

14. The optical network of claim 13, wherein the arrayed waveguide gratings are athermal arrayed waveguide gratings.

* * * * *

UNITED STATES PATENT AND TRADEMARK OFFICE
CERTIFICATE OF CORRECTION

PATENT NO. : 8,285,144 B2
APPLICATION NO. : 12/847220
DATED : October 9, 2012
INVENTOR(S) : Yamada et al.

It is certified that error appears in the above-identified patent and that said Letters Patent is hereby corrected as shown below:

In the specification

Col. 6, line 13, "$M \geqq 3$" should read -- $M \geq 3$ --

Col. 6, line 16, "$N \geqq 3$" should read -- $M \geq 3$ --

Signed and Sealed this
Twenty-first Day of April, 2015

Michelle K. Lee
*Director of the United States Patent and Trademark Office*